April 11, 1961  R. W. MILLER  2,978,841
INTERLOCKING STACKING SPACER AND GUIDE PIN ASSEMBLY
Filed Dec. 10, 1959  2 Sheets-Sheet 1

INVENTOR.
Roy W. Miller,
BY
Sabin C. Bronson
Atty.

April 11, 1961 R. W. MILLER 2,978,841
INTERLOCKING STACKING SPACER AND GUIDE PIN ASSEMBLY
Filed Dec. 10, 1959 2 Sheets-Sheet 2
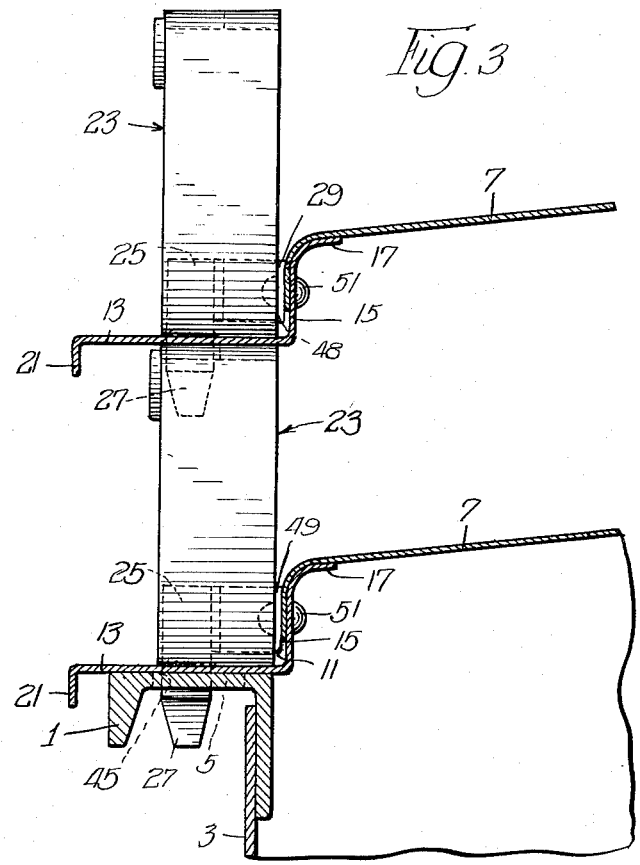
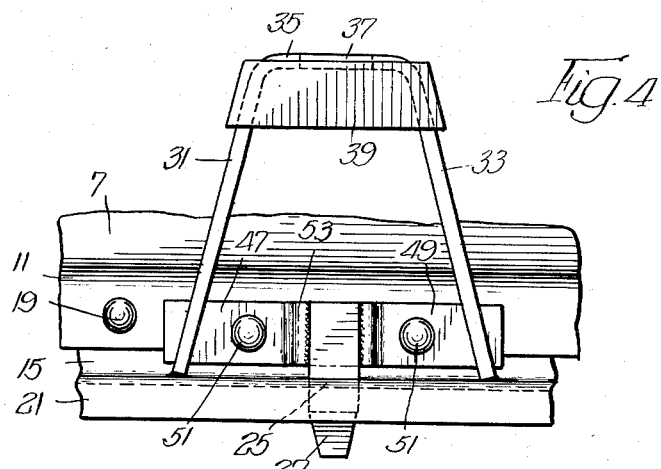
INVENTOR.
Roy W. Miller,
BY Sabin C. Bronson
ATT'Y.

United States Patent Office 2,978,841
Patented Apr. 11, 1961

2,978,841
INTERLOCKING STACKING SPACER AND GUIDE PIN ASSEMBLY

Roy W. Miller, Highland, Ind., assignor to Stanray Corporation, Chicago, Ill., a corporation of Delaware Filed Dec. 10, 1959, Ser. No. 858,685

5 Claims. (Cl. 50—103)

This invention relates to an improved, removable roof for a railroad car with interlocking stacking space and guide pin assembly.

The use of removable roofs for railroad cars has resulted in a very desirable versatility permitting the use of such cars for accommodating an extremely wide range of commodities and goods. The versatility thus provided has created demands on the technology of removable roofs which demands have been increased significantly by the use of diesel powered equipment which causes much more strenuous forces to be exerted upon the cars, both in switching and in transit due to the increased acceleration and power of such equipment.

When a removable roof is secured to a railroad car, not only must the roof be guided into a fairly precise aligned position on the car, but the roof must also be able to withstand the vertical and the horizontal forces tending to dislodge the roof, which forces result from acceleration and the movement of the railroad car along the track. Of these forces, the horizontal forces are of primary concern since the weight of the roof tends to compensate for a significant portion of the vertical forces acting to dislodge the roof.

Therefore, it is the primary object of this invention to provide a removable railroad car roof with interlocking stacking spacer and guide pin assembly, having means for guiding the roof into fairly precise aligned position on the car and for preventing horizontal movement of the roof in relation to the car.

Further, the current trend is to provide removable railroad car roofs in sections so that the appropriate section or sections may be removed from the car and access be had to the contents through the opening thus provided, the remainder of the roof remaining in place to protect the contents. However, in removing selected roof sections the problem arises as to where to store such sections. Since it is particularly inconvenient and often impossible to store these sections adjacent the tracks due to the limitations of space, one of the most readily available solutions is to stack the removed section or sections on top of a single section, whether that section be adjacent the track or remaining in place on the car.

Therefore, it is a further object of this invention to provide removable railroad car roof sections each with a plurality of interlocking stacking spacer and guide pin assemblies including means for preventing horizontal movement between the roof sections and the car and which will retain said roof sections in a stacked, spaced relation supporting the entire weight of the superposed roof sections while preventing horizontal movement of the sections relative to each other at all times and particularly during periods of switching or shipping.

Shipping of these removable car roof sections, by the manufacturer to the customer, presents a problem whether they are shipped as sections or joined as a complete roof.

It is therefore a further object of this invention to provide means whereby not only one section may be stacked upon another for "through the roof" handling of the lading, but whereby two or more complete roofs may be stacked upon one such roof already on the car and shipped as such to the customer, while the car itself may transport lading at the same time.

Further, it is an object of this invention to provide an interlocking stacking spacer and guide pin assembly for removable railroad car roofs, said assembly including elements and an arrangement thereof which protects the guide pin and mounting block from being moved from their proper position for alignment with the stacking frames and the side plate apertures.

Further objects and advantages of the instant invention will become evident from an examination of the particular description and the drawings in which:

Figure 3 is a partial sectional view of one roof section as it would appear stacked upon another;

Figure 4 is a partial side elevational view of a removable roof section embodying the subject invention.

Figure 1:
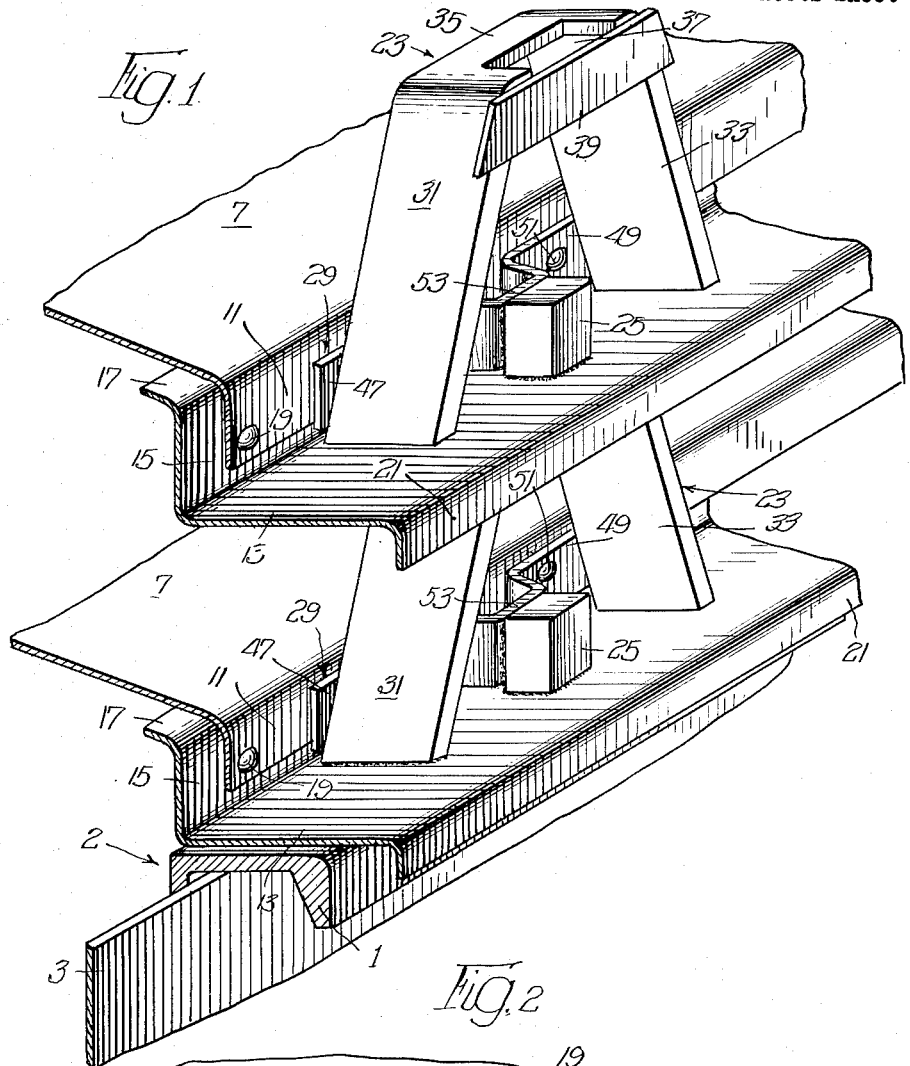
Figure 1 is a perspective view of a railroad car embodying the subject invention and showing a plurality of superposed roof sections.
Figure 2:
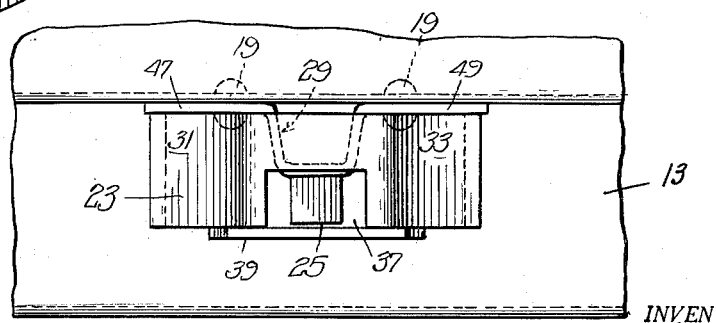
Figure 2 is a plan view of the assembly shown in Figure 1.

As seen in Figure 1 the subject interlocking stacking spacer and guide pin assembly is adapted for use with all types of removable roofs for railroad cars. More particularly, this interlocking stacking spacer and guide pin assembly is suitable for use with removable roofs for railroad gondola cars, which roofs comprise a plurality of sections adapted to cover the entire open area of the car.

Standard railroad cars adapted to receive the removable roofs have bulb angle or other suitable side plates 1 forming the top chord of the side wall of the car 2. The upper longitudinal margin of the side sheathing 3 is secured to the depending flange of the side plate. The side plate 1 extends around the entire perimeter of the railroad car and provides a horizontal supporting surface for the roof.

The removable roof includes a plurality of roof sheets 7 inclined generally upwardly and inwardly toward the ridge of the roof and said roof sheets are joined together at their side margins to form a composite roof section. Each roof sheet 7 terminates in a turned-down roof flange 11 forming the outermost edge of the sheet. Flange 11 is secured to the generally W-shaped roof extension member 13, although this extension member may be of any configuration providing a horizontal leg portion for resting on the side plate or the hereinafter mentioned spacing frame 23.

Roof extension member 13 includes a vertically upwardly extending flange 15 which is bent at its end to form an upwardly and inwardly projecting mount 17 which fits into the juncture of the roof 7 and the turned-down flange 11. The turned-down flange 11 is secured to the upwardly extending extension flange 15 by welding or by rivets 19 as shown. The roof extension member extends horizontally outwardly from the vertical extension flange 15 over the side plate 1 and beyond the outermost extremity thereof to form a downwardly turned extension flange 21 spaced from the outermost edge of the side plate 1. When the roof is in position on the railroad car, the roof extension member 13 completely covers the side plate 1 on both sides of the car.

In Figure 1 is seen the interlocking stacking space and guide pin assembly for use with the aforementioned combination which includes generally a spacing frame 23, a mounting block 25, terminating in a tapered end 27, and a mounting strap 29.

The spacing frame 23 is generally A shaped including two opposed legs 31 and 33 welded to the horizontal surface of the roof extension member 13 in spaced relationship and extending upwardly, toward each other, terminating in a flat supporting surface 35. The supporting surface 35 is formed with a cut-out portion 37 adjacent one edge which with the plate 39 welded adjacent thereto on the frame 23 defines an aperture for a purpose to be described. Directly beneath the supporting surface 35 and the cut-out portion 37, a mounting block 25 is welded to the horizontal surface of the roof extension member 13. This block 25 extends downwardly through a similarly sized opening through the roof extension member 13, and also through a hole 5 through the side plate 1. This hole 5 is elongated transversely of the side plate flange as shown in Fig. 3, which permits some lateral distortion of the side plates. When the roof is in position on the car, the block 25 extends downwardly through hole 5 in the side plate 1.

To prevent the mounting block 25 from being knocked loose from the horizontal surface of the roof extension 13, or out of alignment with the aperture 37, either by forces acting inwardly toward the roof or outwardly therefrom, a corrugated mounting strap 29 is mounted with oppositely extending flanges 47 and 49 fitted tightly between the respective legs 31 and 33 of the spacing frame 23 and the turned-down roof flange 11 of the roof sheet 7 to which the flanges 47 and 49 are secured by rivets 51. The mounting strap 29 projects outwardly from the turned-down roof flange 11 to form a brace 53 which is welded to the side of the mounting block 25. This strap serves to protect the block 25 from forces acting either inwardly or outwardly in relation to the roof while the legs 31 and 33 of the spacing frame 23 serve to prevent the mounting block 25 from being dislodged or misaligned by forces acting longitudinally.

In operation the removable roof is appropriately placed on the side plate 1 with the tapered ends 27 of blocks 25 moving into the corresponding holes 5, guiding the roof into position on the car. When it is desired to remove the roof from the car, a crane may be used and hooked to suitable lifting means on either side of the running board to lift the roof upwardly and longitudinally and stack same on a section of the roof remaining in place on the car. When the roof is so disposed, the stacking spacer frame 23 serves to appropriately space the roofs so as to prevent unnecessary strain on the roof portion and to prevent damage to the roofs when so superposed. Further, the guide blocks 25 of the uppermost roof sections extend downwardly into the apertures 37 in the next lower spacer frames 23 to prevent relative horizontal movement between the roof sections even when the car is in transit. It is to be particularly noted from the foregoing description that the location of the spacer frames 23 about the periphery of each of the sections must be symmetrical to provide alignment permitting receipt of the respective guide blocks 25 within the respective openings.

I claim:

1. An interlocking stacking spacer and guide pin assembly for a removable railroad car roof, including a roof sheet terminating in a peripheral turned-down flange secured to an extension member forming a horizontal mounting surface comprising, a spacing frame having two spaced legs secured to said horizontal surface inclined upwardly toward each other and terminating in a supporting bar defining a central aperture, a mounting block secured to said horizontal surface beneath said frame and including a downwardly projecting guide pin, a mounting strap secured to said turned-down flange and including a flange extending between each of said legs and said turned-down flange and including a central brace secured to said block, said guide pin projecting downwardly through said extension member in vertical alignment with said aperture.

2. An interlocking stacking spacer and guide pin assembly for a removable railroad car roof, including a roof sheet terminating in a peripheral turned-down flange secured to an extension member forming a horizontal mounting surface comprising, a spacing frame having two spaced legs secured to said horizontal surface inclined upwardly toward each other and terminating in a supporting bar having a cut-out portion, a plate secured to said frame adjacent said cut-out portion to define an aperture, a mounting block secured to said horizontal surface beneath said frame, a mounting strap having a flange extending behind each of said legs and secured to said turned-down flange, said flanges projecting outwardly from said turned-down flange to form a brace secured to said mounting block, said mounting block terminating in a guide pin extending downwardly through and below said extension member.

3. A removable railroad car roof comprising a roof sheet terminating in a peripheral turned-down flange, an extension member having an upwardly extending flange secured to said turned-down flange and a horizontal mounting surface, a spacing frame having two spaced legs secured to said horizontal surface inclined upwardly toward each other and terminating in a supporting bar defining a central aperture, a mounting block secured to said horizontal mounting surface beneath said frame, a mounting strap having a flange wedged between each of said legs and said turned-down flange and secured thereto, said flanges projecting outwardly to form a brace secured to said block, said block terminating in a guide pin projecting downwardly through said extension member in alignment with said aperture.

4. A removable roof for a railroad car comprising a roof sheet terminating in a turned-down flange, an extension member having an upwardly projecting flange secured to said turned-down flange and a horizontal mounting surface, a spacing frame having two spaced legs secured to said horizontal surface inclined upwardly toward each other and terminating in a supporting bar having a cut-out portion, a plate secured to said frame adjacent said cut-out portion to define an aperture, a mounting block secured to said horizontal surface beneath said frame and having an axis in vertical alignment with said aperture, a mounting strap having a flange wedged between each of said legs and said turned-down flange and secured thereto, said flanges projecting outwardly from said turned-down flange between said legs to form a brace secured to said mounting block, and a guide pin depending from said mounting block and extending downwardly through and beyond said extension member in vertical alignment with said aperture.

5. A removable railroad car roof comprising a roof sheet, a spacing frame having two spaced legs secured adjacent the edge of said sheet, said legs joined above said roof and defining an aperture, a mounting block secured to said roof beneath said frame, a guide pin depending from said block and projecting downwardly through and beyond said roof sheet in vertical alignment with said aperture.

References Cited in the file of this patent
UNITED STATES PATENTS 1,934,389    Ulsh    Nov. 7, 1933